(12) United States Patent
Okamura et al.

(10) Patent No.: US 9,041,262 B2
(45) Date of Patent: May 26, 2015

(54) STATOR FOR ELECTRIC ROTATING MACHINE

(71) Applicant: DENSO CORPORATION, Kariya, Aichi-pref. (JP)

(72) Inventors: Tomoyuki Okamura, Chiryu (JP); Norio Kamegawa, Nishio (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 13/745,044

(22) Filed: Jan. 18, 2013

(65) Prior Publication Data
US 2013/0181555 A1   Jul. 18, 2013

(30) Foreign Application Priority Data

Jan. 18, 2012 (JP) ................. 2012-007761

(51) Int. Cl.
*H02K 3/24* (2006.01)
*H02K 3/28* (2006.01)
*H02K 3/12* (2006.01)

(52) U.S. Cl.
CPC .. *H02K 3/24* (2013.01); *H02K 3/28* (2013.01); *H02K 3/12* (2013.01)

(58) Field of Classification Search
USPC .................... 310/201, 180, 260, 59
See application file for complete search history.

(56) References Cited

U.S. PATENT DOCUMENTS

| | | |
|---|---|---|
| 5,955,810 A | 9/1999 | Umeda et al. |
| 6,762,528 B2 * | 7/2004 | Wada et al. ............ 310/201 |
| 7,170,211 B2 * | 1/2007 | Chen et al. ............ 310/207 |
| 2002/0093254 A1 | 7/2002 | Asao et al. |
| 2003/0132680 A1 * | 7/2003 | Nakamura et al. ......... 310/180 |
| 2006/0283004 A1 | 12/2006 | Ooiwa |

FOREIGN PATENT DOCUMENTS

| | | |
|---|---|---|
| JP | A-11-164504 | 6/1999 |
| JP | 2002218687 A | 8/2002 |
| JP | 2006353013 A | 12/2006 |

OTHER PUBLICATIONS

Feb. 6, 2015 Office Action issued in Japanese Patent Application No. 2012-007761.

* cited by examiner

*Primary Examiner* — Dang Le
(74) *Attorney, Agent, or Firm* — Oliff PLC

(57) ABSTRACT

A stator coil includes first to fourth in-slot portions and first and second turn portions. Both the first and third in-slot portions are received in one slot of a stator core, while both the second and fourth in-slot portions are received in another slot. The first and second turn portions both protrude from an axial end face of the stator core and respectively connect the pair of the first and second in-slot portions and the pair of the third and fourth in-slot portions. The second turn portion is located inside the first turn portion. When viewed along an axial direction of the stator core, the first and second turn portions extend so as to cross each other with a reference line C interposed therebetween; the reference line C is defined to extend along a circumferential direction of the stator core through an intersection between the first and second turn portions.

4 Claims, 4 Drawing Sheets

FRONT SIDE ←⎯⎯⎯→ REAR SIDE

STATOR FOR ELECTRIC ROTATING MACHINE

CROSS-REFERENCE TO RELATED APPLICATION

This application is based on and claims priority from Japanese Patent Application No. 2012-7761, filed on Jan. 18, 2012, the content of which is hereby incorporated by reference in its entirety into this application.

BACKGROUND

1. Technical Field

The present invention relates to stators for electric rotating machines that are used in, for example, motor vehicles as electric motors and electric generators.

2. Description of Related Art

There is disclosed, for example in Japanese Unexamined Patent Application Publication No. H11-164504, a stator for an electric rotating machine which includes a stator coil formed by joining corresponding pairs of ends of electric conductor segments. The stator coil has a double annular structure. More specifically, the electric conductor segments forming the stator coil are comprised of a plurality of pairs of large and small U-shaped electric conductor segments. For each electric conductor segment pair, turn portions of the large and small electric conductor segments have substantially the same shape and are twisted in the same direction so as to extend in the same direction. Further, the turn portion of the small electric conductor segment is surrounded by the turn portion of the large electric conductor segment so as to extend on the inner side of the turn portion of the large electric conductor segment.

With the above structure, however, it may be difficult to effectively cool the turn portions of the small electric conductor segments. More specifically, as described previously, the turn portions of the large electric conductor segments have substantially the same shape and the same extending direction as those of the small electric conductor segments. Therefore, when cooling air is supplied from the radially inside to coil ends of the stator coil, which are made up of the turn portions of the large and small electric conductor segments, the cooling air first makes contact with the turn portions of the large electric conductor segments and then changes its course to pass by the turn portions of the large electric conductor segments. Consequently, the turn portions of the large electric conductor segments can be effectively cooled by the cooling air. However, the turn portions of the small electric conductor segments, which are located on the inner side of those of the large electric conductor segments, will be shielded from the cooling air by the turn portions of the large electric conductor segments. As a result, the turn portions of the small electric conductor segments may not be effectively cooled by the cooling air.

SUMMARY

According to an exemplary embodiment, there is provided a stator for an electric rotating machine which includes a hollow cylindrical stator core and a stator coil mounted on the stator core. The stator core has a plurality of slots formed along the circumferential direction of the stator core. The stator coil includes first to fourth in-slot portions and first and second turn portions. The first and second in-slot portions are respectively received in two different ones of the slots of the stator core. The third in-slot portion is received in the same slot as the first in-slot portion. The fourth in-slot portion is received in the same slot as the second in-slot portion. Both the first and second turn portions protrude from an axial end face of the stator core so as to be located outside the slots of the stator core. The first turn portion connects the first and second in-slot portions. The second turn portion connects the third and fourth in-slot portions. The second turn portion is located inside the first turn portion. Further, when viewed along the axial direction of the stator core, the first and second turn portions extend so as to cross each other with a reference line C interposed therebetween; the reference line C is defined to extend along the circumferential direction of the stator core through an intersection between the first and second turn portions.

With the above arrangement of the first and second turn portions, the second turn portion can be directly exposed to and thereby effectively cooled by cooling air that passes by the first turn portion after making contact with and thereby cooling the first turn portion. That is, it is possible to effectively cool both the first and second turn portions of the stator coil.

In a further implementation, the electric rotating machine includes a cooling fan to create a flow of the cooling air for cooling the stator coil. Each of the first and second turn portions includes an apex part that is positioned axially furthest from the axial end face of the stator core in the turn portion. The extending direction of the apex part of the first turn portion is substantially coincident with the flow direction of the cooling air, while the extending direction of the apex part of the second turn portion is transverse to the flow direction of the cooling air.

With the above arrangement, when the cooling air passes by the first turn portion, the apex part of the first turn portion can serve as a guide vane to guide the flow of the cooling air, thereby lowering the resistance of the stator coil to the flow of the cooling air and thus increasing the flow rate of the cooling air. Moreover, the apex part of the second turn portion can be more reliably exposed to the cooling air, thereby being more effectively cooled by the cooling air.

It is preferable that each of the first to the fourth in-slot portions has a substantially rectangular cross section. In this case, it is possible to maximize the space factors of the stator coil in the slots of the stator core and minimize the electrical resistance of the stator coil. Consequently, it is possible to lower the temperature of the entire stator coil.

The stator coil may be comprised of a plurality of substantially U-shaped electric conductor segments that are mounted on the stator core and electrically connected to one another. In this case, it is possible to easily realize the above-described arrangement of the first and second turn portions of the stator coil.

Preferably, the first in-slot portion is located radially inside the third in-slot portion in one of the two slots of the stator core, while the second in-slot portion is located radially outside the fourth in-slot portion in the other slot. In this case, it is possible to reliably make the first and second turn portions cross each other.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
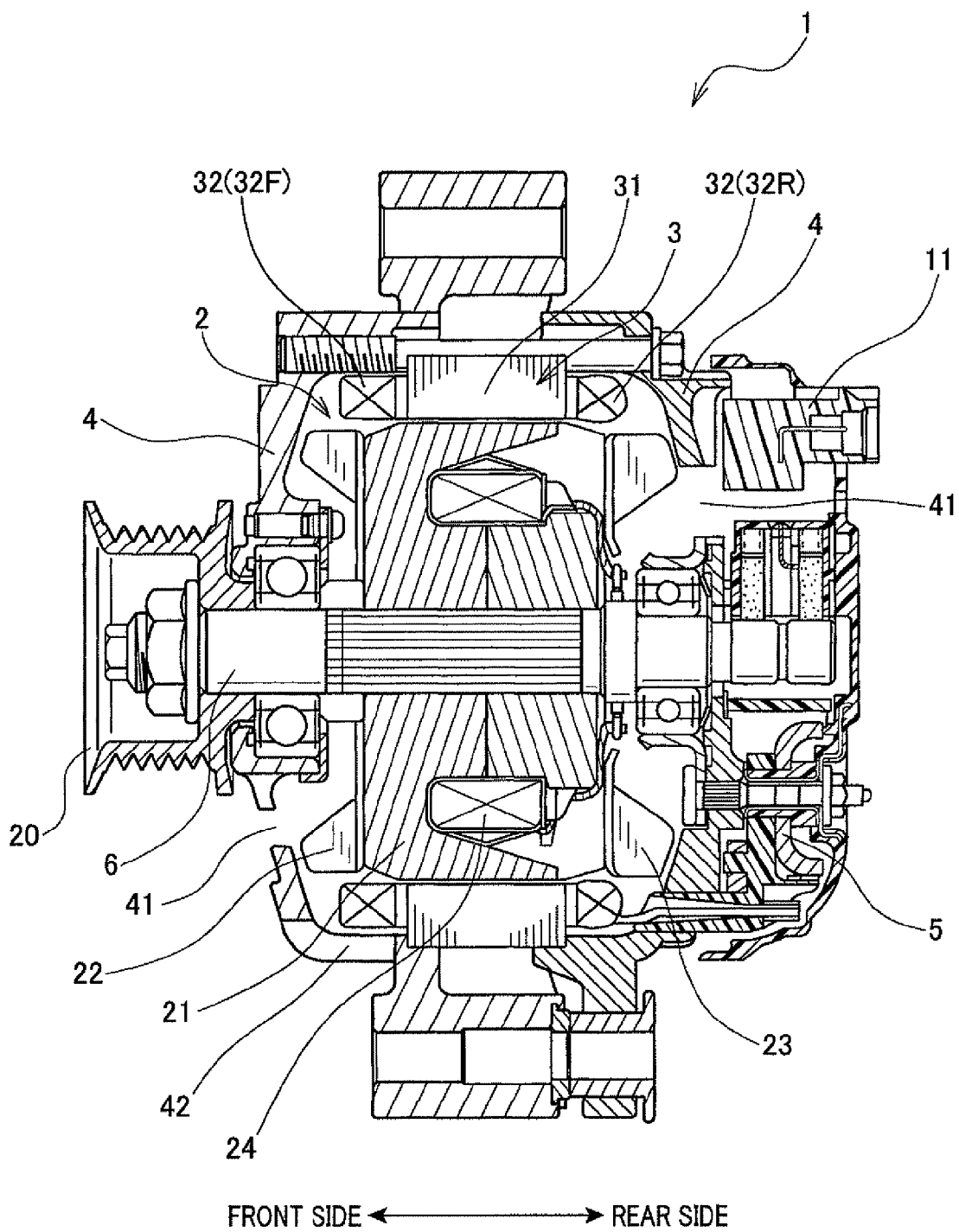
FIG. 1 is a partially cross-sectional view showing the overall configuration of an automotive alternator which includes a stator according to an exemplary embodiment.

FIG. 1 shows the overall configuration of an automotive alternator 1 according to an exemplary embodiment. The alternator 1 is designed to be used in a motor vehicle, such as a passenger car or a truck.

As shown in FIG. 1, the alternator 1 includes a rotor 2, a stator 3, a frame 4, a rectifier 5, a voltage regulator 11 and a pulley 20.

The rotor 2 includes a rotating shaft 6, a pair of Lundell-type magnetic pole cores 21 and a field coil 24. The rotating shaft 6 is rotatably supported by the frame 4. The rotating shaft 6 has the pulley 20 mounted on a front end portion (i.e., a left end portion in FIG. 1) thereof, so that it can be driven by an internal combustion engine (not shown) of the vehicle via the pulley 20. Each of the magnetic pole cores 21 has a plurality of magnetic pole claws. The field coil 24 is made of, for example, an insulation-treated copper wire and wound into a hollow cylindrical shape. The magnetic pole cores 21 are fixed on the rotating shaft 6 with the field coil 24 held between the magnetic pole cores 21. In addition, on a rear end portion (i.e., a right end portion in FIG. 1) of the rotating shaft 6, there are provided a pair of slip rings via which field current is supplied to the field coil 24 during rotation of the rotor 2.

The stator 3 includes a hollow cylindrical stator core 31 and a three-phase stator coil 32 mounted on the stator core 31. The detailed configuration of the stator 3 will be described later.

The frame 4 has both the rotor 2 and the stator 3 retained therein so that the stator 3 surrounds the rotor 2 with a predetermined radial gap formed therebetween.

The rectifier 5 rectifies three-phase AC power outputted from the stator coil 32 into DC power and outputs the obtained DC power via output terminals thereof.

The voltage regulator 11 regulates the voltage of the DC power outputted from the rectifier 5.

Moreover, in the present embodiment, the alternator 1 further includes a pair of cooling fans 22 and 23 that are respectively provided on axial end faces of the magnetic pole cores 21 of the rotor 2. The cooling fans 21 and 22 suck cooling air into the alternator 1 via suction openings 41 formed in front and rear end walls of the frame 4 and discharge the cooling air out of the alternator 1 via discharge openings 42 formed in a circumferential wall (or side wall) of the frame 4. With the cooling air, it is possible to cool the stator coil 32, the rectifier 5 and the regulator 11 during operation of the alternator 1. In addition, it should be noted that though not shown in FIG. 1, the discharge openings 42 are formed not only in a front part but also in a rear part of the frame 4.

Next, the configuration of the stator 3 according to the present embodiment will be described in detail.

As shown in FIGS. 2-5, the stator core 31 has a plurality of slots 310 that are formed in the radially inner surface of the hollow cylindrical stator core 31 so as to be spaced from one another at equal intervals in the circumferential direction of the stator core 31. Each of the slots 310 extends in the axial direction of the stator core 31 so as to axially penetrate the stator core 31 in the axial direction. In addition, for each of the slots 310, the depth-wise direction of the slot 310 coincides with a radial direction of the stator core 31.

Figure 2:
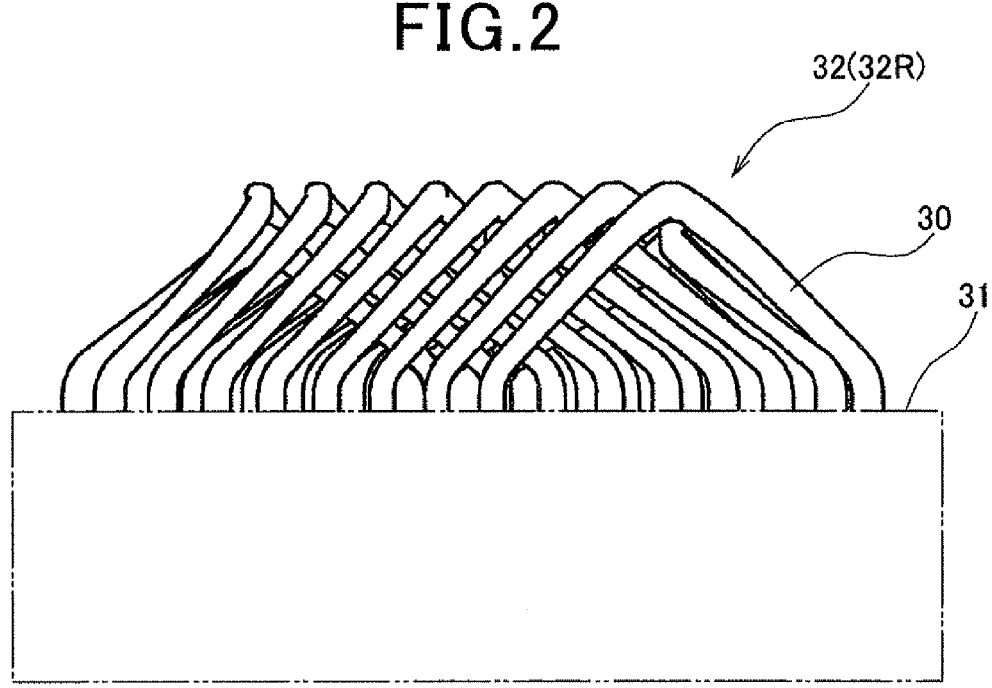
FIG. 2 is a side view showing a rear-side coil end of a stator coil of the stator.
Figure 3:
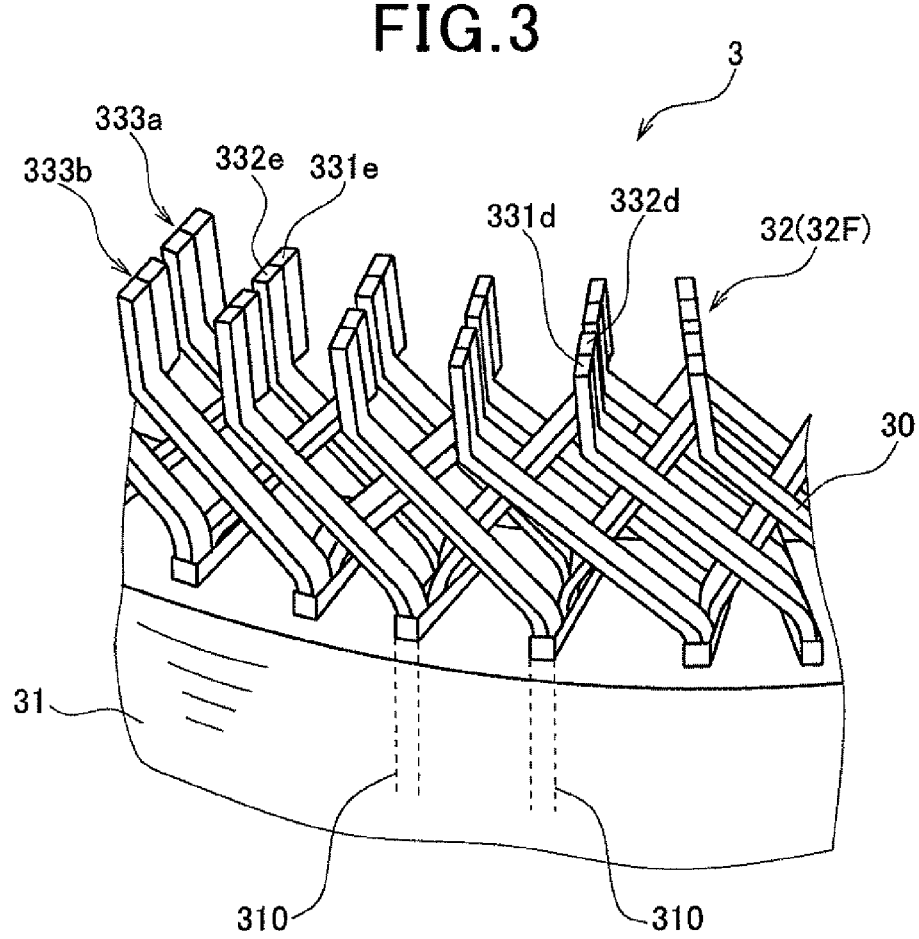
FIG. 3 is a perspective view showing a front-side coil end of the stator coil.

The three-phase stator coil 32 is partially received in the slots 310 of the stator core 31 so as to have front-side and rear-side coil ends 32F and 32R. As shown in FIGS. 1-3, the front-side coil end 32F protrudes from a front end face (or one axial end face) of the stator core 31, while the rear-side coil end 32R protrudes from a rear end face (or the other axial end face) of the stator core 31.

In the present embodiment, the stator coil 32 is comprised of a plurality of electric conductor segments 30 mounted on the stator core 31. Each of the electric conductor segments 30 is substantially U-shaped and has a substantially rectangular cross section perpendicular to its extending direction.

Specifically, before being mounted to the stator core 31, each of the electric conductor segments 30 has a pair of straight portions extending parallel to each other and a turn portion that connects ends of the straight portions on the same side. In forming the stator coil 32, the straight portions are axially inserted, from one axial side (i.e., the rear side in FIG. 1) of the stator core 31, respectively into corresponding two of the slots 310 of the stator core 31; the corresponding two slots 310 are positioned away from each other by one magnetic pole pitch. Then, free end parts of the straight portions, which respectively protrude outside the corresponding slots 310 on the other axial side (i.e., the front side in FIG. 1) of the stator core 31, are bent so as to extend along the circumferential direction of the stator core 31 obliquely at a predetermined angle with respect to the axial end face of the stator core 31. Thereafter, corresponding pairs of the free ends of the electric conductor segments 30 are joined by, for example, welding.

Consequently, in the resultant stator coil 32, each of the electric conductor segments 30 has a pair of in-slot portions, a turn portion and a pair of end portions. The in-slot portions are respectively received in the corresponding two slots 310 of the stator core 31 and extend in the axial direction of the stator core 31. The turn portion connects the in-slot portions on the one axial side of the stator core 31. The end portions respectively extend from the in-slot portions on the other axial side of the stator core 31.

Figure 5:
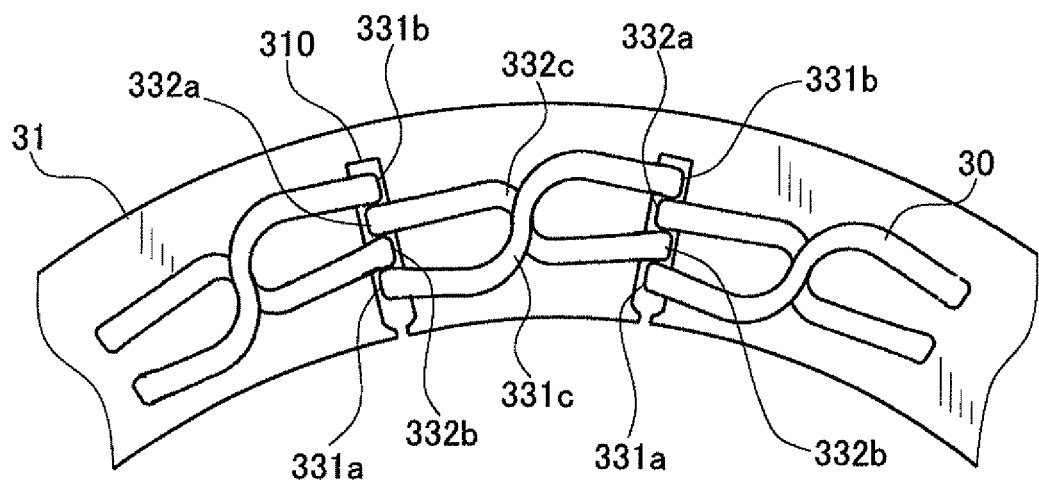
FIG. 5 is an axial end view showing only that part of the rear-side coil end of the stator coil which is also shown in FIG. 4.

In the present embodiment, as shown in FIG. 5, in each of the slots 310 of the stator core 31, there are received four in-slot portions of the electric conductor segments 30 so as to be aligned with each other in the radial direction of the stator core 31 (or in the depth-wise direction of the slot 310). Hereinafter, the four in-slot portions are sequentially referred to as an inside in-slot portion, an inside-center in-slot portion, an outside-center in-slot portion and an outside in-slot portion from the radially inside to the radially outside of the slot 310. In addition, all the four in-slot portions received in the same slot 310 belong to the same phase of the stator coil 32.

Moreover, the in-slot portions received in the slots 310 of the stator core 31 are electrically connected to one another in a predetermined manner, forming the stator coil 32.

Specifically, as shown in FIG. 5, on the one axial side (i.e., the rear side in FIG. 1) of the stator core 31, for each of the slots 310, the inside in-slot portion 331a in the slot 310 is connected, via a corresponding turn portion 331c, to the outside in-slot portion 331*b* in another one of the slots 310 which is positioned away from the slot 310 clockwise by one magnetic pole pitch. Moreover, the outside-center in-slot portion 332*a* in the slot 310 is connected, via a corresponding turn portion 332*c*, to the inside-center in-slot portion 332*b* in that slot 310 which is positioned away from the slot 310 clockwise by one magnetic pole pitch. Furthermore, the turn portion 331*c* that connects the pair of the inside in-slot portion 331*a* and the outside in-slot portion 331*b* is located outside the turn portion 332*c* that connects the pair of the outside-center in-slot portion 332*a* and the inside-center in-slot portion 332*b*.

Consequently, on the one axial side of the stator core 31, all the turn portions 331*c* and 332*c* of the electric conductor segments 30 together make up the rear-side coil end 32R of the stator coil 32, as shown in FIG. 2. Moreover, all the turn portions 331*c* together make up an axially outer layer of the rear-side coil end 32R, while all the turn portions 332*c* together make up an axially inner layer of the rear-side coil end 32R. That is to say, the rear-side coil end 32R has a double annular structure.

On the other hand, on the other axial side (i.e., the front side in FIG. 1) of the stator core 31, for each of the slots 310, the inside-center in-slot portion 332*b* in the slot 310 is connected to the inside in-slot portion 331*a* in another one of the slots 310 which is positioned away from the slot 310 clockwise by one magnetic pole pitch. Moreover, the outside in-slot portion 331*b* in the slot 310 is connected to the outside-center in-slot portion 332*a* in that slot 310 which is positioned away from the slot 310 clockwise by one magnetic pole pitch.

More specifically, as shown in FIG. 3, the inside-center in-slot portion 332*b* and the inside in-slot portion 331*a* respectively received in the two slots 310, which are positioned away from each other by one magnetic pole pitch, are connected to each other by joining that end portion 332*e* of one electric conductor segment 30 which extends from the inside-center in-slot portion 332*b* and that end portion 331*e* of another electric conductor segment 30 which extends from the inside in-slot portion 331*a*. In addition, the end portion 332*e* and the end portion 331*e* are joined, for example by TIG welding or ultrasonic welding, forming a joint 333*a* therebetween. Moreover, the outside in-slot portion 331*b* and the outside-center in-slot portion 332*a* respectively received in the two slots 310, which are positioned away from each other by one magnetic pole pitch, are connected to each other by joining that end portion 331*d* of one electric conductor segment 30 which extends from the outside in-slot portion 331*b* and that end portion 332*d* of another electric conductor segment 30 which extends from the outside-center in-slot portion 332*a*. In addition, the end portion 331*d* and the end portion 332*d* are joined, for example by TIG welding or ultrasonic welding, forming a joint 333*b* therebetween.

Consequently, on the other axial side of the stator core 31, all the end portions 331*d*, 331*e*, 332*d* and 332*e* of the electric conductor segments 30 and the joints 333*a* and 333*b* formed therebetween together make up the front-side coil end 32F of the stator coil 32, as shown in FIG. 3. Moreover, all the end portions 331*e* and 332*e* of the electric conductor segments 30 and the joints 333*a* formed therebetween together make up a radially inner layer of the front-side coil end 32F, while all the end portions 331*d* and 332*d* of the electric conductor segments 30 and the joints 333*b* formed therebetween together make up a radially outer layer of the front-side coil end 32F. That is to say, the front-side coil end 32F also has a double annular structure.

Figure 4:
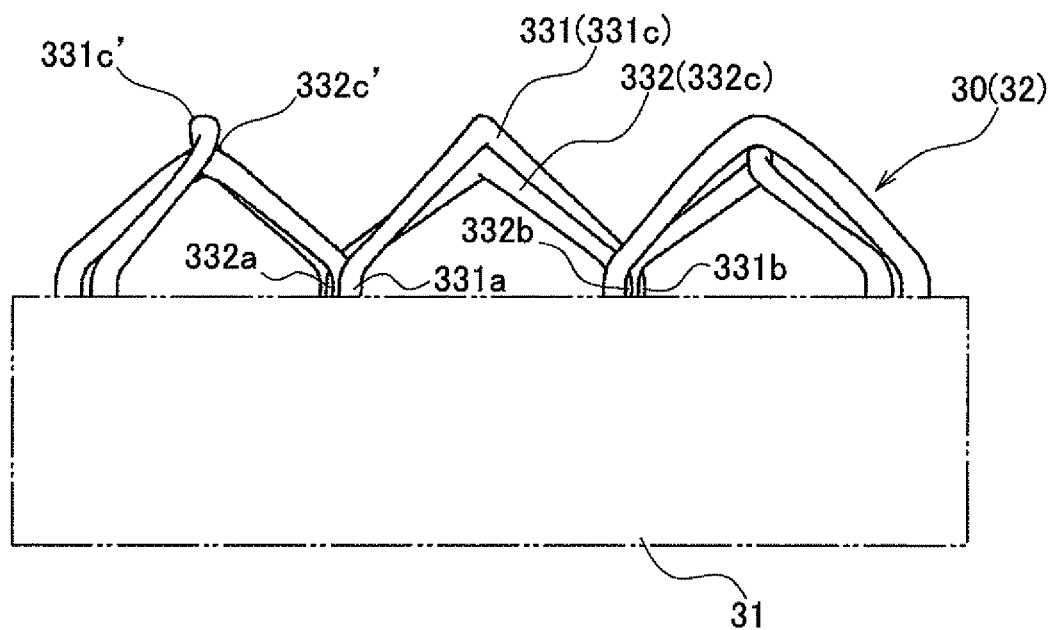
FIG. 4 is a side view showing only part of the rear-side coil end of the stator coil which corresponds to one of three phases of the stator coil.

Furthermore, in the present embodiment, as shown in FIG. 4, the electric conductor segments 30 forming the stator coil 32 are comprised of a plurality of pairs of large and small U-shaped electric conductor segments 331 and 332; the small electric conductor segment 332 is located inside the large electric conductor segment 331.

More specifically, the large electric conductor segment 331 includes one inside in-slot portion 331*a*, one outside in-slot portion 331*b*, one turn portion 331*c* that connects the inside in-slot portion 331*a* and the outside in-slot portion 331*b* on the rear side of the stator core 31, one end portion 331*d* that extends from the outside in-slot portion 331*b* on the front side of the stator core 31, and one end portion 331*e* that extends from the inside in-slot portion 331*a* on the front side of the stator core 31. On the other hand, the small electric conductor segment 332 includes one outside-center in-slot portion 332*a*, one inside-center in-slot portion 332*b*, one turn portion 332*c* that connects the outside-center in-slot portion 332*a* and the inside-center in-slot portion 332*b* on the rear side of the stator core 31, one end portion 332*d* that extends from the outside-center in-slot portion 332*a* on the front side of the stator core 31, and one end portion 332*e* that extends from the inside-center in-slot portion 332*b* on the front side of the stator core 31.

In operation of the alternator 1, with rotation of the cooling fan 23 (see FIG. 1), the cooling air flows through spaces formed between the turn portions 331*e* and 332*c* at the rear-side coil end 32R of the stator coil 32.

Figure 6:
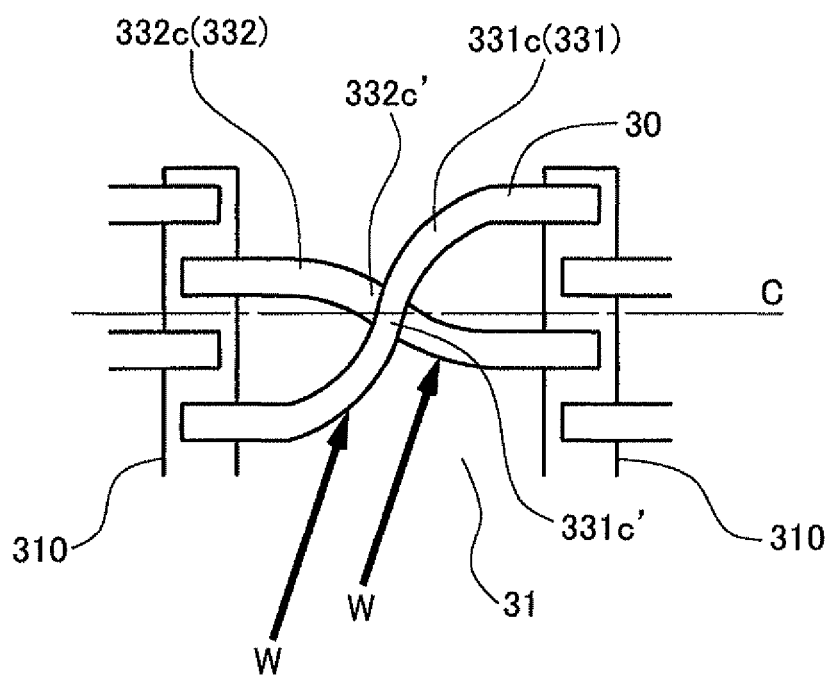
FIG. 6 is a schematic view illustrating the extending directions of turn portions of a pair of large and small electric conductor segments forming the stator coil as well as the flow direction of cooling air for cooling the stator coil.

FIG. 6 illustrates the extending directions of the turn portions 331*c* and 332*c* of the large and small U-shaped electric conductor segments 331 and 332 (or the stator coil 32) according to the present embodiment as well as the flow direction W of the cooling air that cools the rear-side coil end 32R of the stator coil 32.

As shown in FIG. 6, the flow direction W of the cooling air is not coincident with any radial direction of the stator core 31, in other words, is not perpendicular to the circumferential direction of the stator core 31. Instead, the cooling air flows obliquely with respect to the circumferential direction of the stator core 31, reaching the turn portions 331*c* of the large electric conductor segments 331 that are located outside the turn portions 332*c* of the small electric conductor segments 332.

In the present embodiment, as described previously, for each pair of the large and small electric conductor segments 331 and 332, the in-slot portion 331*a* of the large electric conductor segment 331 is received in the same slot 310 as the in-slot portion 332*a* of the small electric conductor segment 332. The in-slot portion 331*b* of the large electric conductor segment 331 is received in the same slot 310 as the in-slot portion 332*b* of the small electric conductor segment 332. The slot 310 receiving the in-slot portions 331*a* and 332*a* is positioned away from the slot 310 receiving the in-slot portions 331*b* and 332*b* by one magnetic pole pitch. Further, the in-slot portion 331*a* of the large electric conductor segment 331 is located radially inside the in-slot portion 332*a* of the small electric conductor segment 332, while the in-slot portion 331*h* of the large electric conductor segment 331 is located radially outside the in-slot portion 332*b* of the small electric conductor segment 332 (see FIG. 5). Consequently, as shown in FIG. 6, when viewed along the axial direction of the stator core 31, the turn portion 331*c* of the large electric conductor segment 331 and the turn portion 332*c* of the small electric conductor segment 332 extend so as to cross each other with a reference line C interposed therebetween; the reference line C is defined to extend along the circumferential direction of the stator core 31 through an intersection between the turn portions 331*c* and 332*c*.

With the above arrangement of the turn portions 331*c* and 332*c* of the large and small electric conductor segments 331 and 332, the turn portions 332c of the small electric conductor segments 332 can be directly exposed to and thereby effectively cooled by the cooling air that passes by the turn portions 331c of the large electric conductor segments 331 after making contact with and thereby cooling the turn portions 331c. As a result, it is possible to effectively cool the entire rear-side coil end 32R of the stator coil 32.

Further, as shown in FIGS. 4 and 6, in the present embodiment, each of the turn portions 331c of the large electric conductor segments 331 has an apex part 331c' that is positioned axially furthest from the axial end face of the stator core 31 in the turn portion 331c. Similarly, each of the turn portions 332c of the small electric conductor segments 332 has an apex part 332e that is positioned axially furthest from the axial end face of the stator core 31 in the turn portion 332c. For each of the turn portions 331c of the large electric conductor segments 331, the extending direction of the apex part 331e' of the turn portion 331c is substantially coincident with the flow direction W of the cooling air. On the other hand, for each of the turn portions 332c of the small electric conductor segments 332, the extending direction of the apex part 332e' of the turn portion 332c is transverse to the flow direction W of the cooling air.

With the above arrangement, when the cooling air passes by the turn portions 331c of the large electric conductor segments 331, the apex parts 331c' of the turn portions 331c can serve as guide vanes to guide the flow of the cooling air, thereby lowering the resistance of the rear-side coil end 32R of the stator coil 32 to the flow of the cooling air and thus increasing the flow rate of the cooling air. Moreover, the apex parts 332c' of the turn portions 332c can be more reliably exposed to the cooling air, thereby being more effectively cooled by the cooling air.

In the present embodiment, the stator coil 32 is formed by joining corresponding pairs of the end portions 331d, 331e, 332d and 332e of the large and small U-shaped electric conductor segments 331 and 332.

With the above formation of the stator coil 32, it is possible to easily arrange the turn portions 331c and 332c as described above.

In the present embodiment, each of the large and small U-shaped electric conductor segments 331 and 332 is configured to have a substantially rectangular cross section. That is, each of the in-slot portions 331a, 331b, 332a and 332b of the large and small U-shaped electric conductor segments 331 and 332 has a substantially rectangular cross section perpendicular to the axial direction of the stator core 31.

With the above configuration, it is possible to maximize the space factors of the in-slot portions 331a, 331b, 332a and 332b of the electric conductor segments 331 and 332 in the slots 310 of the stator core 31 and minimize the electrical resistance of the stator coil 32. Consequently, it is possible to lower the temperature of the entire stator coil 32.

While the above particular embodiment has been shown and described, it will be understood by those skilled in the art that various modifications, changes, and improvements may be made without departing from the spirit of the invention.

For example, in the previous embodiment, the present invention is directed to the stator 3 for the automotive alternator 1. However, the invention can also be applied to stators for other electric rotating machines, such as a stator for an electric motor and a stator for a motor-generator that can function both as an electric motor and as an electric generator.

In the previous embodiment, the electric conductor segments 30 (i.e., the pairs of the large and small U-shaped electric conductor segments 331 and 332) forming the stator coil 32 are configured to have a substantially rectangular cross section. However, the electric conductor segments 30 may also be configured to have cross sections of other shapes, such as a substantially circular cross section.

In the previous embodiment, the stator coil 32 is formed by joining corresponding pairs of the ends of the U-shaped electric conductor segments 30. However, the stator coil 32 may also be formed by joining corresponding pairs of ends of a plurality of continuous electric wires that are wound around the stator core 31 and much longer than the electric conductor segments 30.

In the previous embodiment, the stator 3 is obtained by assembling the U-shaped electric conductor segments 30 to the hollow cylindrical stator core 31 and joining corresponding pairs of the ends of the U-shaped electric conductor segments 30. However, the stator 3 may also be obtained by: (1) winding a plurality of continuous electric wires around a flat band-shaped stator core; and (2) rolling the flat band-shaped stator core into a hollow cylindrical shape.

What is claimed is:

1. A stator for an electric rotating machine, the stator comprising:
    a hollow cylindrical stator core having a plurality of slots formed along a circumferential direction of the stator core; and
    a stator coil mounted on the stator core, the stator coil including first to fourth in-slot portions and first and second turn portions, the first and second in-slot portions being respectively received in two different ones of the slots of the stator core, the third in-slot portion being received in the same slot as the first in-slot portion, the fourth in-slot portion being received in the same slot as the second in-slot portion, both the first and second turn portions protruding from an axial end face of the stator core so as to be located outside the slots of the stator core, the first turn portion connecting the first and second in-slot portions, the second turn portion connecting the third and fourth in-slot portions, the second turn portion being located inside the first turn portion, wherein
    when viewed along an axial direction of the stator core, the first and second turn portions extending so as to cross each other with a reference line C interposed therebetween, the reference line C being defined to extend along the circumferential direction of the stator core through an intersection between the first and second turn portions,
wherein:
    the electric rotating machine includes a cooling fan to create a flow of cooling air for cooling the stator coil, and
    each of the first and second turn portions includes an apex part that is positioned axially furthest from the axial end face of the stator core in the turn portion, and the extending direction of the apex part of the first turn portion is substantially coincident with the flow direction of the cooling air, while the extending direction of the apex part of the second turn portion is transverse to the flow direction of the cooling air.

2. The stator as set forth in claim 1, wherein each of the first to the fourth in-slot portions has a substantially rectangular cross section.

3. The stator as set forth in claim 1, wherein the stator coil is comprised of a plurality of substantially U-shaped electric conductor segments that are mounted on the stator core and electrically connected to one another.

4. The stator as set forth in claim 1, wherein the first in-slot portion is located radially inside the third in-slot portion in one of the two slots of the stator core, while the second in-slot portion is located radially outside the fourth in-slot portion in the other slot.

* * * * *